(12) United States Patent
Zhao et al.

(10) Patent No.: US 10,775,653 B2
(45) Date of Patent: Sep. 15, 2020

(54) ARRAY SUBSTRATE, LIQUID CRYSTAL PANEL, AND PROCESS OF FABRICATING THE ARRAY SUBSTRATE

(71) Applicants: BOE Technology Group Co., Ltd., Beijing (CN); Chongqing BOE Optoelectronics Technology Co., Ltd., Chongqing (CN)

(72) Inventors: Yanli Zhao, Beijing (CN); Xiaoji Li, Beijing (CN); Zhi Zhang, Beijing (CN); He Sun, Beijing (CN); Xing Dong, Beijing (CN); Lijun Xiong, Beijing (CN); Tae Yup Min, Beijing (CN)

(73) Assignees: BOE Technology Group Co., Ltd., Beijing (CN); Chongqing BOE Optoelectronics Technology Co., Ltd., Chongqing (CN)

( * ) Notice: Subject to any disclaimer, the term of this patent is extended or adjusted under 35 U.S.C. 154(b) by 43 days.

(21) Appl. No.: 16/003,422

(22) Filed: Jun. 8, 2018

(65) Prior Publication Data

US 2019/0056610 A1 Feb. 21, 2019

(30) Foreign Application Priority Data

Aug. 17, 2017 (CN) .......................... 2017 1 0707165

(51) Int. Cl.
*G02F 1/1343* (2006.01)
*G02F 1/133* (2006.01)
(Continued)

(52) U.S. Cl.
CPC ...... *G02F 1/13306* (2013.01); *G02F 1/13439* (2013.01); *G02F 1/134309* (2013.01);
(Continued)

(58) Field of Classification Search
None
See application file for complete search history.

(56) References Cited

U.S. PATENT DOCUMENTS

2004/0212763 A1\* 10/2004 Tsuchiya ........... G02F 1/133753
349/114
2008/0100762 A1\* 5/2008 Onogi ............... G02F 1/134363
349/39
(Continued)

FOREIGN PATENT DOCUMENTS

CN 102439517 A 5/2012
CN 102707515 A 10/2012
(Continued)

OTHER PUBLICATIONS

Office Action dated Sep. 20, 2019 for 201710707165.6.

*Primary Examiner* — Parul H Gupta
(74) *Attorney, Agent, or Firm* — Arent Fox LLP; Michael Fainberg

(57) ABSTRACT

The disclosure discloses an array substrate, a liquid crystal panel, and a process of fabricating the array substrate. The array substrate includes an orientation film, an upper electrode, a lower electrode, and an intermediate electrode located between the upper electrode and the lower electrode, wherein the intermediate electrode is configured to have drive voltage applied thereto when there is zero relative voltage between the upper electrode and the lower electrode, so that an electric field is generated between the intermediate electrode and the lower electrode, and a direction of the electric field is parallel to an orientation direction of the orientation film.

10 Claims, 5 Drawing Sheets

(51) Int. Cl.
  *G09G 3/36* (2006.01)
  *G02F 1/1337* (2006.01)
  *G02F 1/1339* (2006.01)
  *G02F 1/1362* (2006.01)
  *G02F 1/1368* (2006.01)
  *G02F 1/1333* (2006.01)

(52) U.S. Cl.
  CPC ..... *G02F 1/134363* (2013.01); *G09G 3/3696* (2013.01); *G02F 1/1337* (2013.01); *G02F 1/1339* (2013.01); *G02F 1/1368* (2013.01); *G02F 1/136286* (2013.01); *G02F 2001/133388* (2013.01); *G02F 2001/133738* (2013.01); *G02F 2001/134372* (2013.01); *G02F 2201/121* (2013.01); *G02F 2201/123* (2013.01); *G02F 2201/128* (2013.01)

(56) References Cited

U.S. PATENT DOCUMENTS

| | | | |
|---|---|---|---|
| 2010/0007593 A1* | 1/2010 | Mori | G02F 1/133555 349/94 |
| 2012/0008074 A1 | 1/2012 | Murata et al. | |
| 2012/0069282 A1* | 3/2012 | Okazaki | G02F 1/134363 349/139 |
| 2013/0235311 A1* | 9/2013 | Onaka | C09B 67/0002 349/108 |
| 2015/0062524 A1* | 3/2015 | Kim | G02F 1/1339 349/153 |
| 2017/0153468 A1 | 6/2017 | Yang | |

FOREIGN PATENT DOCUMENTS

| | | |
|---|---|---|
| CN | 205643881 U | 10/2016 |
| CN | 106814510 A | 6/2017 |
| JP | 2004354407 A | 12/2004 |

* cited by examiner

ARRAY SUBSTRATE, LIQUID CRYSTAL PANEL, AND PROCESS OF FABRICATING THE ARRAY SUBSTRATE

CROSS-REFERENCE TO RELATED APPLICATION

This application claims priority to Chinese Patent Application No. 201710707165.6, filed on Aug. 17, 2017, the content of which is incorporated by reference in the entirety.

TECHNICAL FIELD

This disclosure relates to the field of display technologies, and particularly to an array substrate, a liquid crystal panel, and a process of fabricating the array substrate.

DESCRIPTION OF THE RELATED ART

A transversely driven liquid crystal display has been widely applied in various fields, but a blue spot tends to occur on the transversely driven liquid crystal display subjected to an oblique force while being transported, and in static and dynamic pressure tests of a client, thus seriously degrading the product yield. The blue spot occurs because an orientation film in a display area is scratched by a post spacer at an edge of the display area due to the oblique force from the outside. The liquid crystal display in the related art is not applied with any driven voltage in a non-display state, and liquid crystal molecules are arranged in an orientation direction of the orientation film; and if the orientation film is damaged, then the liquid crystal molecules may be arranged out of order in the non-display state, so that light may be leaked. Since the post spacer is typically arranged on a gate line of a blue sub-pixel of a pixel element, the phenomenon of light leakage typically appears as a blue spot in the display area.

SUMMARY

Embodiments of the disclosure provide an array substrate, a liquid crystal panel, and a process of fabricating the array substrate.

In an aspect, embodiments of the disclosure provide an array substrate including an orientation film, an upper electrode, a lower electrode, and an intermediate electrode located between the upper electrode and the lower electrode; wherein the intermediate electrode is configured to have drive voltage applied thereto when there is zero relative voltage between the upper electrode and the lower electrode, so that an electric field is generated between the intermediate electrode and the lower electrode, and a direction of the electric field is parallel to an orientation direction of the orientation film.

In some embodiments, the upper electrode is a slit pixel electrode.

In some embodiments, the intermediate electrode includes a plurality of slit electrodes.

In some embodiments, the lower electrode is a common electrode.

In some embodiments, the intermediate electrode is located in an edge area in a set range of a display area.

In some embodiments, the edge area in the set range is an area spaced from an edge of the display area by 0 to 50 micrometers.

In some embodiments, a material of the intermediate electrode includes Indium Tin Oxide (ITO).

In some embodiments, the array substrate further includes an insulation layer configured to insulate the upper electrode, the lower electrode, and the intermediate electrode from each other.

In some embodiments, a material of the insulation layer includes an organic mixture of barium carbonate and polyimide.

In another aspect, the embodiments of the disclosure further provide a liquid crystal panel including an array substrate; wherein the array substrate includes an orientation film, an upper electrode, a lower electrode, and an intermediate electrode located between the upper electrode and the lower electrode; wherein the intermediate electrode is configured to have drive voltage applied thereto when there is zero relative voltage between the upper electrode and the lower electrode, so that an electric field is generated between the intermediate electrode and the lower electrode, and a direction of the electric field is parallel to an orientation direction of the orientation film.

In some embodiments, the upper electrode is a slit pixel electrode.

In some embodiments, the intermediate electrode includes a plurality of slit electrodes.

In some embodiments, the lower electrode is a common electrode.

In some embodiments, the intermediate electrode is located in an edge area in a set range of a display area.

In some embodiments, the edge area in the set range is an area spaced from an edge of the display area by 0 to 50 micrometers.

In some embodiments, a material of the intermediate electrode includes Indium Tin Oxide (ITO).

In some embodiments, the array substrate further includes an insulation layer configured to insulate the upper electrode, the lower electrode, and the intermediate electrode from each other.

In some embodiments, a material of the insulation layer includes an organic mixture of barium carbonate and polyimide.

In another aspect, embodiments of the disclosure further provide a liquid crystal panel including an array substrate.

In some embodiments, the liquid crystal panel further includes: a drive control circuit configured to apply drive voltage to the intermediate electrode when there is zero relative voltage between the upper electrode and the lower electrode, so that the electric field is generated between the intermediate electrode and the lower electrode, and the direction of the electric field is parallel to the orientation direction of the orientation film.

In still another aspect, the embodiments of the disclosure further provide a process of fabricating an array substrate, the process including an operation of fabricating an orientation film, wherein the process further includes operations of: fabricating an upper electrode and a lower electrode, and fabricating an intermediate electrode located between the upper electrode and the lower electrode, wherein the intermediate electrode is configured to have drive voltage applied thereto when there is zero relative voltage between the upper electrode and the lower electrode, so that an electric field is generated between the intermediate electrode and the lower electrode, and a direction of an electric field is parallel to an orientation direction of the orientation film.

BRIEF DESCRIPTION OF THE DRAWINGS

In order to make the technical solutions according to embodiments of the disclosure more apparent, the drawings to which a description of the embodiments refers will be briefly introduced below, and apparently the drawings to be described below are merely illustrative of some of the embodiments of the disclosure, and those ordinarily skilled in the art can derive from these drawings other drawings without any inventive effort.

DETAILED DESCRIPTION OF THE EMBODIMENTS

Figure 1:
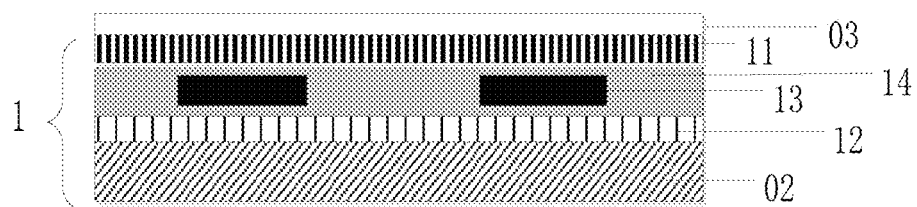
FIG. 1 is a first schematic structural diagram of an array substrate according to the embodiments of the disclosure.

In order to make the objects, technical solutions, and advantages of the disclosure more apparent, the disclosure will be described below in further details with reference to the drawings, and apparently the embodiments to be described are only a part but not all of the embodiments of the disclosure. Based upon the embodiments here of the disclosure, all the other embodiments which can occur to those ordinarily skilled in the art without any inventive effort shall fall into the scope of the disclosure.

The shapes and sizes of respective components in the drawings are not intended to reflect any real proportion, but only intended to illustrate the content of the disclosure.

Figure 2:
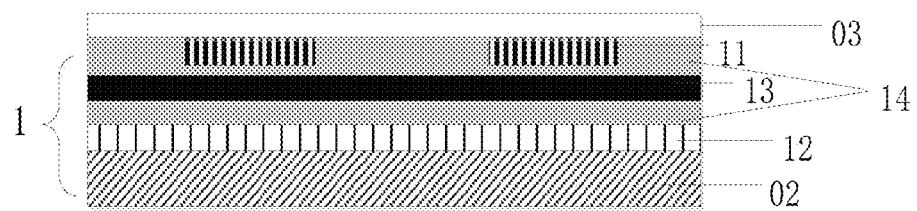
FIG. 2 is a second schematic structural diagram of an array substrate according to the embodiments of the disclosure.

Embodiments of the disclosure provide an array substrate as illustrated in FIG. 1 (a longitudinal sectional view) and FIG. 2 (a transverse sectional view), where the array substrate 1 includes: an orientation film 03, an upper electrode 11, a lower electrode 12, and an intermediate electrode 13 located between the upper electrode 11 and the lower electrode 12, where the intermediate electrode 13 is configured to have drive voltage applied thereto when there is zero relative voltage between the upper electrode 11 and the lower electrode 12, so that an electric field is generated between the intermediate electrode 13 and the lower electrode 12, and a direction of the electric field is parallel to an orientation direction of the orientation film.

Where the longitudinal sectional view as described in the embodiments of the disclosure refers to a section along an extension direction of the upper electrode in a plane of the array substrate.

The transverse sectional view as described in the embodiments of the disclosure refers to a section along a direction perpendicular to the extension direction of the upper electrode in the plane of the array substrate.

In some embodiments, in the array substrate above according to the embodiments of the disclosure, the upper electrode 11 is a slit pixel electrode, that is, the upper electrode refers to a plurality of slit pixel electrodes in the related art, and configured to cooperate with a common electrode in a display state to create an electric field to drive liquid crystals to be deflected.

In some embodiments, in the array substrate above according to the embodiments of the disclosure, the lower electrode 12 is a common electrode, that is, the lower electrode is a planar common electrode in the related art.

In some embodiments, in the array substrate above according to the embodiments of the disclosure, the intermediate electrode 13 includes a plurality of electrodes which are slit.

In some embodiments, in the array substrate above according to the embodiments of the disclosure, both the upper electrode and the intermediate electrode are slit electrodes, and the extension direction of the upper electrode is perpendicular to an extension direction of the intermediate electrode.

In the art of a liquid crystal panel, the orientation film needs to be rubbed so that there are orientation lines on a surface of the orientation film, and also so that when a liquid crystal panel is powered off, a relative voltage between the pixel electrode and the common electrode is zero, and there is no electric field to drive the liquid crystal molecules to be deflected, the liquid crystal molecules are arranged in a rubbing direction (i.e., the orientation direction) at some inclination angle and azimuth angle. For example, when an oblique force is applied to the liquid crystal panel while the liquid crystal panel is being carried or tested, the orientation film is scratched by a post spacer in the liquid crystal panel, so that the orientation lines on the surface of the orientation film are damaged, and the liquid crystal molecules will not be arranged in the original rubbing direction, and there is a deflection angle φ of the liquid crystal molecules arranged out of order.

Where a transmittance equation of the liquid crystal panel is as follows.

$$T = T_0 \text{Sin}^2(2\Phi)\text{Sin}^2(\Delta nd \times \pi/\lambda).$$

Where normally, i.e. in a case that the orientation lines of the orientation film are not damaged, in a non-display state: $\Delta nd \neq 0$, $\phi = 0$; where $T_0$ is a normalization constant, d is a thickness of a liquid crystal layer, and $\Delta nd$ is a difference in light journey arising from the thickness of the liquid crystal layer.

Apparently when the deflection angle φ is changed, the transmittance T is also changed, thus resulting in light leakage. The post spacer which tends to scratch the orientation film is typically arranged on the gate line corresponding to the blue sub-pixel, so the phenomenon of light leakage typically appears as a blue spot in the display area of the liquid crystal display.

Following the analysis above of the reason for the problem in the related art, an operating principle of technical solutions according to the embodiments of the disclosure will be described with reference to FIG. 3 and FIG. 4 by way of an example.

Figure 3:
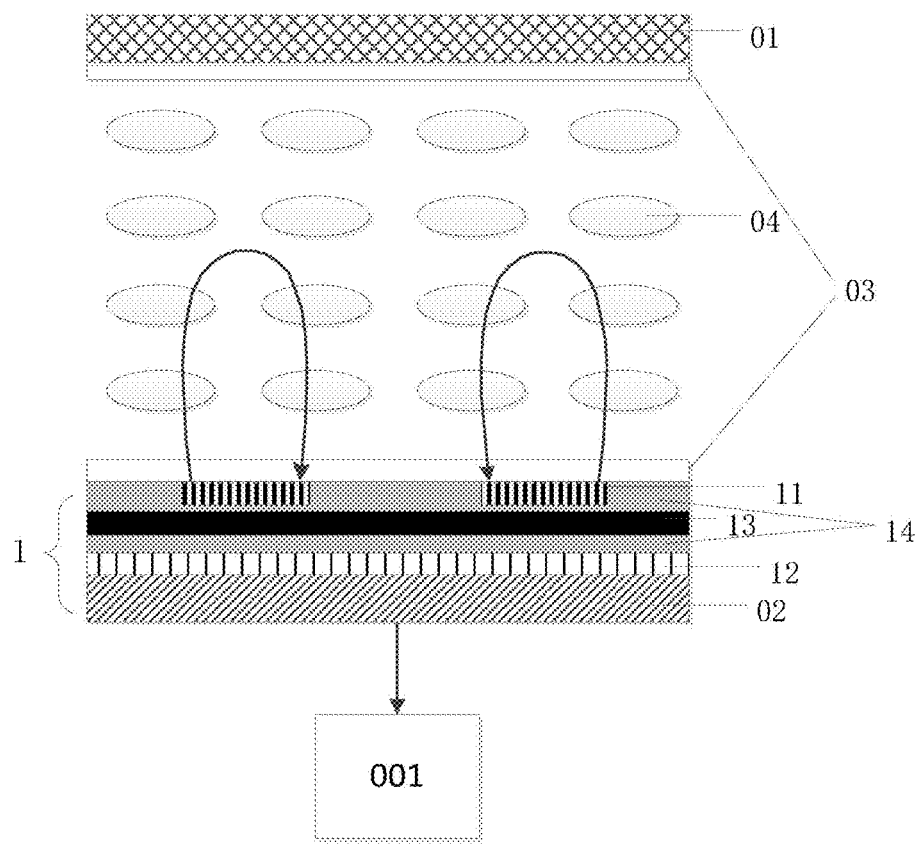
FIG. 3 is a first operating principle diagram of a liquid crystal display according to the embodiments of the disclosure.

As illustrated in FIG. 3 (a transverse sectional view), while the liquid crystal panel is displaying normally, a drive power supply $V_{on}$ is applied to the upper electrode 11, and the relative voltage between the lower electrode 12 and the intermediate electrode 13 is 0, so that while the liquid crystal panel is displaying normally, an edge electric field (as denoted by an arrow in FIG. 3) is generated between the upper electrode 11 and the lower electrode 12, where the direction of the electric field is parallel to the array substrate 1, so that the electric field drives the liquid crystal molecules to rotate into parallel arrangement for displaying, thus resulting in a display effect of a wide angle of view and high contrast. Where, in FIG. 3, 01 represents a Color Filter (CF) substrate, 04 represents a liquid crystal molecule, 02 represents a Thin Film Transistor (TFT) substrate connected with the lower electrode 12, and 001 represents a drive control circuit of the liquid crystal panel in the normal display state.

Figure 4:
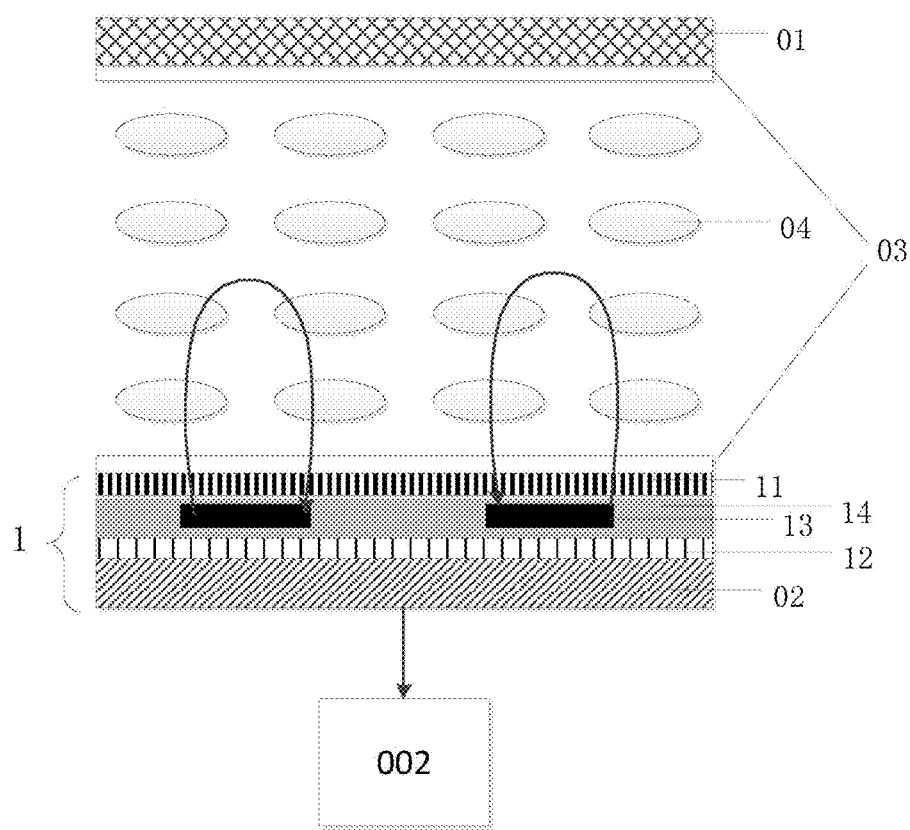
FIG. 4 is a second operating principle diagram of a liquid crystal display according to the embodiments of the disclosure.

As illustrated in FIG. 4 (a longitudinal sectional view), in the non-display state (L0 state) of the liquid crystal panel, the relative voltage between the upper electrode 11 and the lower electrode 12 is 0, drive voltage $V_x$ is applied to the intermediate electrode 13, where $0<V_x<V_{on}$, so that an electric field is generated between the intermediate electrode 13 and the lower electrode 12, and the direction of the electric field is parallel to the orientation direction of the orientation film 03 (as denoted by an arrow in FIG. 4). Therefore, even if the orientation film 03 is scratched, the electric field can be generated in the L0 state to drive the liquid crystal molecules to be arranged in order, thus alleviating or eliminating a blue spot. Where in FIG. 4, 01 represents a CF substrate, 04 represents a liquid crystal molecule, 02 represents a TFT substrate connected with the lower electrode 12, and 002 represents a drive control circuit of the liquid crystal panel in the L0 state.

In the array substrate above according to the embodiments of the disclosure, the intermediate electrode is arranged between the upper electrode and the lower electrode, so that an electric field parallel to the orientation direction of the orientation film is generated in a liquid crystal box, even in the non-display state of the liquid crystal panel, to drive the liquid crystal molecules to be arranged. Therefore, the problem of when the orientation film is scratched by a post spacer, the orientation film cannot drive the liquid crystal molecules to be arranged in the orientation direction of the orientation film in the non-display state of the liquid crystal panel, so that the liquid crystal molecules are arranged out of order, thus resulting in light leakage in the display area can be avoided, so as to improve the display quality. On the other hand, in the technical solution according to the embodiments of the disclosure, the arrangement of the liquid crystal molecules in the non-display state of the liquid crystal panel can be changed to thereby significantly improve the problem of a blue spot while the liquid crystal panel is being manufactured, so as to avoid a labor and time from being wasted on complicated modification at a client, and to cut down unnecessary rebuilding of a production line, thus significantly addressing the problem of a blue spot arising from static and dynamic pressure tests of the client, and assembling of the production line.

Figure 5:
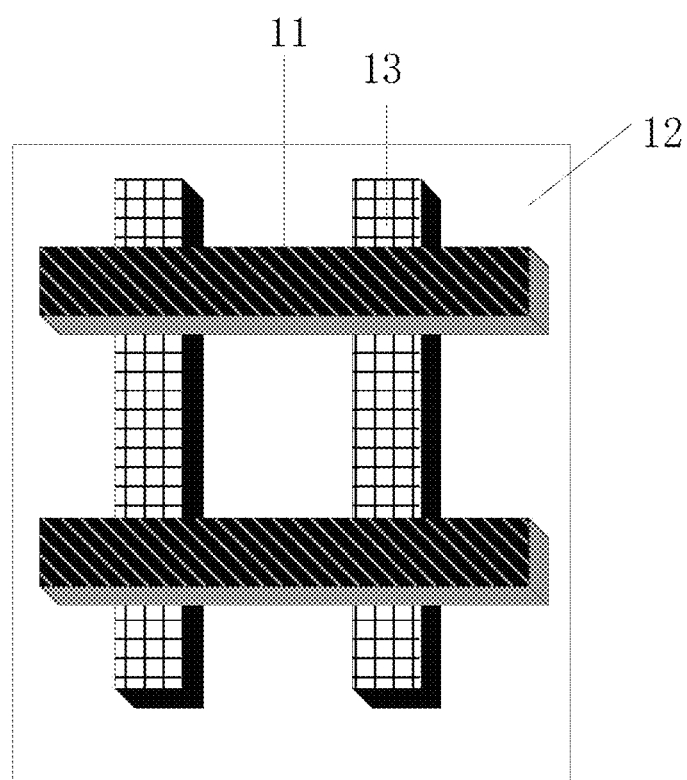
FIG. 5 is a schematic diagram of electrodes arranged in an array substrate according to the embodiments of the disclosure.

In some embodiments, in the array substrate above according to the embodiments of the disclosure, as illustrated in FIG. 5, the upper electrode 11 and the intermediate electrode 13 are arranged perpendicular to each other, and both of them are parallel to the lower electrode 12, for example. And of course, the intermediate electrode 13 can alternatively be arranged otherwise relative to the upper electrode 11 as long as the intermediate electrode 13 can generate a guide electric field parallel to the orientation direction in the L0 state, although the embodiments of the disclosure will not be limited thereto. Actually the arrangement position and pattern of the intermediate electrode can be adjusted as needed.

In some embodiments, the array substrate above according to the embodiments of the disclosure operates under such a principle that a layer of intermediate electrode 13 is additionally arranged to have drive voltage applied thereto in the L0 state so that the electric field parallel to the orientation direction is generated between the intermediate electrode and the lower electrode, therefore, the array substrate above according to the embodiments of the disclosure can be applicable to any transversely driven liquid crystal panel, i.e., a liquid crystal panel including an array substrate to which a direction of a driving electric field is parallel, e.g., an In-Plane Switching (IPS) liquid crystal panel, an Advanced Super Dimension Switching (ADS) liquid crystal panel, etc.

In some embodiments, in the array substrate above according to the embodiments of the disclosure, the material of the intermediate electrode 13 includes Indium Tin Oxide (ITO), or other transparent conductive materials.

Figure 6:
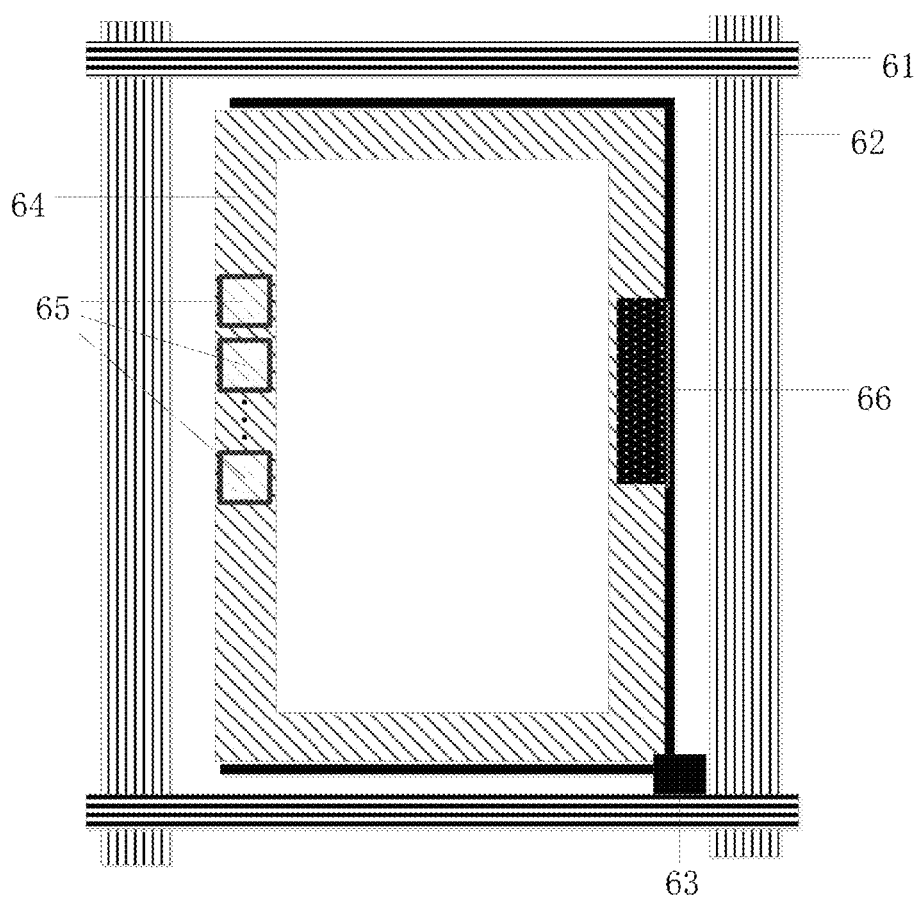
FIG. 6 is a schematic diagram of a layout area of an array substrate according to the embodiments of the disclosure.

In some embodiments, in the array substrate above according to the embodiments of the disclosure, as illustrated in FIG. 6, the intermediate electrode is located in an edge area in a set range of a display area. As illustrated in FIG. 6, 61 represents a gate line, 62 represents a data line, 63 represents a thin film transistor, 64 represents a layout area in the embodiments of the disclosure, i.e., the edge area of the display area, and 66 represents a post spacer. Since the post spacer 66 is typically arranged in the edge area 64 of the display area, the edge area 64 of the display area is an area where the orientation film is frequently damaged. By way of an example in which a plurality of intermediate electrodes 65 are arranged sequentially in the edge area 64 in the set range of the display area, voltage $V_x$ can be applied to the intermediate electrodes 65 in the L0 state so that an electric field is generated to drive the liquid crystal molecules in the edge area 64 of the display area to be arranged in the orientation direction of the orientation film, to thereby avoid the liquid crystal molecules from being arranged out of order as a result of the orientation film being scratched by the post spacer, so as to avoid light leakage, and to improve the display quality.

In the array substrate above according to the embodiments of the disclosure, since the post spacer is typically arranged in the edge area of the display area, the edge area is an area where the orientation film is frequently damaged; and the intermediate electrode is additionally arranged in the edge area, so that the electric field parallel to the orientation direction can be generated even in the non-display state of the liquid crystal panel to thereby avoid the liquid crystal molecules from being arranged out of order, so as to avoid light from being leaked in the display area, and to improve the display quality.

In some embodiments, in the array substrate above according to the embodiments of the disclosure, the edge area in the set range is an area spaced from an edge of the display area by 0 to 50 micrometers, for example.

In some embodiments, in the array substrate above according to the embodiments of the disclosure, as illustrated in FIG. 1, the array substrate 1 further includes an insulation layer 14 configured to insulate the upper electrode 11, the lower electrode 12, and the intermediate electrode 13 from each other.

In some embodiments, in the array substrate above according to the embodiments of the disclosure, a material of the insulation layer 14 includes an organic mixture of barium carbonate and polyimide, for example. In some embodiments, a content of barium carbonate is 50%, and a dielectric constant thereof is 30.

In the array substrate above according to the embodiments of the disclosure, the insulation layer is arranged between the upper electrode, the lower electrode, and the intermediate electrode, so that the electrodes will not disturb with each other, thus improving the structural stability.

Based upon the same inventive concept, as illustrated in FIG. 3 and FIG. 4, the embodiments of the disclosure further provide a liquid crystal panel including the array substrate 1 above according to the embodiments of the disclosure.

Where reference can be made to the description of the array substrate above according to the embodiments of the disclosure for a particular implementation of the liquid crystal panel, so a repeated description thereof will be omitted here.

In some embodiments, the liquid crystal panel further includes a CF substrate 01 located above the array substrate 1, and liquid crystal molecules 04 located between the array substrate 1 and the CF substrate 01.

In some embodiments, an orientation film 03 is further arranged on a side of the CF substrate 01 facing the array substrate 1.

In some embodiments, in the liquid crystal panel above according to the embodiments of the disclosure, the liquid crystal panel further includes two separate drive control circuits; where one of the two separate drive control circuits is configured to power the upper electrode 11 in a normal display state, so that an edge electric field is generated between the upper electrode 11 and the lower electrode 12, and the direction of the electric field is parallel to the array substrate 1; the other one is configured to power the intermediate electrode 13 in the L0 state so that an electric field is generated between the intermediate electrode 13 and the lower electrode 12, and the direction of the electric field is parallel to the orientation direction of the orientation film 03.

In the liquid crystal panel above according to the embodiments of the disclosure, a separate drive control circuit is arranged for the intermediate electrode, so that drive voltage can be applied to the intermediate electrode, even in the non-display state of the liquid crystal panel, to generate an electric field parallel to the orientation direction of the orientation film to drive the liquid crystal molecules to be arranged.

A drive control mode of the liquid crystal panel above according to the embodiments of the disclosure will be described below by way of an example.

As illustrated in FIG. 3, the drive control circuit 001 is configured to provide drive voltage to the liquid crystal panel while the liquid crystal panel is displaying normally, so that a drive power supply $V_{on}$ is applied to the upper electrode 11, and the relative voltage between the lower electrode 12 and the intermediate electrode 13 is 0. In this way, while the liquid crystal panel is displaying normally, an edge electric field (as denoted by an arrow in FIG. 3) is generated between the upper electrode 11 and the lower electrode 12, where the direction of the edge electric field is parallel to the array substrate 1, so that the edge electric field drives the liquid crystal molecules to rotate into parallel arrangement for displaying, thus resulting in a display effect of a wide angle of view and high contrast.

As illustrated in FIG. 4, the drive control circuit 002 is configured to provide voltage to the intermediate electrode 13 while the liquid crystal panel is in the L0 state, so that drive voltage $V_x$ is applied to the intermediate electrode 13, the relative voltage between the upper electrode 11 and the lower electrode 12 is 0, thus an electric field is generated between the intermediate electrode 13 and the lower electrode 12, and the direction of the electric field is parallel to the orientation direction of the orientation film 03 (as denoted by an arrow in FIG. 4). Thus even if the orientation film 03 is scratched, the electric field can be generated in the L0 state to drive the liquid crystal molecules to be arranged in order, thus alleviating or eliminating a blue spot.

Here the drive control circuit 001 and the drive control circuit 002 can be the same drive control circuit, or can be different drive control circuits. That is, the same liquid crystal display panel can include two drive ICs to control driving of the electrodes separately in the normal display mode and the L0 mode, or can include only one drive IC to control driving of the electrodes both in the normal display mode and the L0 mode.

In summary, the technical solutions above according to the embodiments of the disclosure can control driving of the liquid crystal panel separately in the normal display and L0 states, so the liquid crystal panel can be driven separately in the L0 state, so that the electric fields will not interfere with each other across the two states, thus improving the display stability of the liquid crystal panel.

Based upon the same inventive concept, the embodiments of the disclosure further provide a process of fabricating an array substrate, the process including an operation of fabricating an orientation film, and further includes operations of: fabricating an upper electrode and a lower electrode, and fabricating an intermediate electrode located between the upper electrode and the lower electrode, where the intermediate electrode is configured to have drive voltage applied thereto when there is zero relative voltage between the upper electrode and the lower electrode, so that an electric field is generated between the intermediate electrode and the lower electrode, and a direction of the electric field is parallel to an orientation direction of the orientation film.

In some embodiments, in the process above of fabricating the array substrate according to the embodiments of the disclosure, the lower electrode 12 can be fabricated in a sputter-coating process, for example; the upper electrode 11 and the intermediate electrode 13 are made of a material, which can be slit Indium Tin Oxide (IOT), for example, and can be fabricated in a sputter-coating process, for example, where photoresist is coated, and then exposed and etched into slit ITO electrodes on the edges of pixels; and there is an insulation layer 14 with a high dielectric constant between the upper electrode 11 and the intermediate electrode 13, and between the lower electrode 12 and the intermediate electrode 13, and the insulation layer can be fabricated in a Plasma Enhanced Chemical Vapor Deposition (PECVD), for example.

The embodiments of the disclosure provide an array substrate, a liquid crystal panel, and a process of fabricating the array substrate, where the intermediate electrode is additionally arranged between the upper electrode and the lower electrode, and the liquid crystal panel is driven separately in the normal display state and the non-display state, so that the liquid crystal molecules are driven separately in the non-display state; and in this way, the electric field can be generated even in the non-display state to drive the liquid crystal molecules to be arranged in the orientation direction of the orientation film, to thereby avoid the problem that in the case that the orientation film is scratched by the post spacer, the orientation film cannot drive the liquid crystal molecules to be arranged in the orientation direction of the orientation film in the non-display state, so that the liquid crystal molecules are arranged out of order, thus resulting in light leakage in the display area, so as to improve the display quality. On the other hand, in the technical solutions according to the embodiments of the disclosure, the arrangement of the liquid crystal molecules in the non-display state of the liquid crystal panel can be changed to thereby significantly improve the problem of a blue spot while the liquid crystal panel is being manufactured, so as to avoid a labor and time from being wasted on complicated modification at a client, and to cut down unnecessary rebuilding of a production line, thus significantly addressing the problem of a blue spot arising from static and dynamic pressure tests of the client, and assembling of the production line.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. An array substrate, comprising:
a first substrate;
a lower common electrode on the first substrate;
a first insulation layer on the lower common electrode and in contact with the lower common electrode;
an intermediate pixel electrode on the first insulation layer and in contact with the first insulation layer;
a second insulation layer on the intermediate pixel electrode and in contact with the intermediate pixel electrode;
an upper pixel electrode on the second insulation layer and in contact with the second insulation layer;
an orientation film on the upper pixel electrode; and
a liquid crystal layer on the orientation film;
wherein the lower common electrode, the first insulation layer, the intermediate pixel electrode, the second insulation layer, the upper pixel electrode, and the orientation film are located between the first substrate and the liquid crystal layer;
wherein the lower common electrode is a planar common electrode, the upper pixel electrode and the intermediate pixel electrode are slits pixel electrode and perpendicular to each other; and
wherein the intermediate pixel electrode is located in an edge area, where a post spacer is arranged, in a set range of a display area;
wherein when a liquid crystal panel including the array substrate is in a display state, the upper pixel electrode is configured to have a first drive voltage applied thereto, providing a zero relative voltage between the intermediate pixel electrode and the lower common electrode, so that an edge electric field, parallel in direction to an orientation direction of the orientation film, is generated between the upper pixel electrode and the lower common electrode, to enable an orientation direction of liquid crystal molecules in the liquid crystal layer to be parallel to the orientation direction of the orientation film;
wherein when a liquid crystal panel including the array substrate is in a non-display state, the intermediate pixel electrode is configured to have a second drive voltage applied thereto providing a zero relative voltage between the upper pixel electrode and the lower common electrode, so that a transverse electric field, parallel in direction to the orientation direction of the orientation film, is generated between the intermediate pixel electrode and the lower common electrode, to enable the orientation direction of liquid crystal molecules in the liquid crystal layer to be maintained to be parallel to the orientation direction of the orientation film.

2. The array substrate according to claim 1, wherein the edge area in the set range is an area spaced from an edge of the display area by 0 to 50 micrometers.

3. The array substrate according to claim 1, wherein a material of the intermediate pixel electrode comprises Indium Tin Oxide (ITO).

4. The array substrate according to claim 1, wherein a material of the first insulation and the second insulation layer comprises an organic mixture of barium carbonate and polyimide.

5. A liquid crystal panel, comprising an array substrate; wherein the array substrate comprises:
a first substrate;
a lower common electrode on the first substrate;
a first insulation layer on the lower common electrode and in contact with the lower common electrode;
an intermediate pixel electrode on the first insulation layer and in contact with the first insulation layer;
a second insulation layer on the intermediate pixel electrode and in contact with the intermediate pixel electrode;
an upper pixel electrode on the second insulation layer and in contact with the second insulation layer;
an orientation film on the upper pixel electrode; and
a liquid crystal layer on the orientation film;
wherein the lower common electrode, the first insulation layer, the intermediate pixel electrode, the second insulation layer, the upper pixel electrode, and the orientation film are located between the first substrate and the liquid crystal layer;
wherein the lower common electrode is a planar common electrode, the upper pixel electrode and the intermediate pixel electrode are slits pixel electrode and perpendicular to each other; and
wherein the intermediate pixel electrode is located in an edge area, where a post spacer is arranged, in a set range of a display area;
wherein when the liquid crystal panel is in a display state, the upper pixel electrode is configured to have a first drive voltage applied thereto, providing a zero relative voltage between the intermediate pixel electrode and the lower common electrode, so that an edge electric field, parallel in direction to an orientation direction of the orientation film, is generated between the upper pixel electrode and the lower common electrode, to enable an orientation direction of liquid crystal molecules in the liquid crystal layer to be parallel to the orientation direction of the orientation film;
wherein when the liquid crystal panel is in a non-display state, the intermediate pixel electrode is configured to have a second drive voltage applied thereto providing a zero relative voltage between the upper pixel electrode and the lower common electrode, so that a transverse electric field, parallel in direction to the orientation direction of the orientation film, is generated between the intermediate pixel electrode and the lower common electrode, to enable the orientation direction of liquid crystal molecules in the liquid crystal layer to be maintained to be parallel to the orientation direction of the orientation film.

6. The liquid crystal panel according to claim 5, wherein the edge area in the set range is an area spaced from an edge of the display area by 0 to 50 micrometers.

7. The liquid crystal panel according to claim 5, wherein a material of the intermediate pixel electrode comprises Indium Tin Oxide (ITO).

8. The liquid crystal panel according to claim 5, wherein a material of the first insulation layer and the second insulation layer comprises an organic mixture of barium carbonate and polyimide.

9. The liquid crystal panel according to claim 5, wherein the liquid crystal panel further comprises: a drive control circuit configured to apply the second drive voltage to the intermediate pixel electrode when there is zero relative voltage between the upper pixel electrode and the lower common electrode, so that the transverse electric field is generated between the intermediate electrode and the lower common electrode, and the direction of the transverse electric field is parallel to the orientation direction of the orientation film.

10. A process of fabricating an array substrate, the process comprising:

fabricating a first substrate;

forming a lower common electrode on the first substrate;

forming a first insulation layer on the lower common electrode, wherein the first insulation layer is in contact with the lower common electrode;

forming an intermediate pixel electrode on the first insulation layer, wherein the intermediate pixel electrode is in contact with the first insulation layer;

forming a second insulation layer on the intermediate pixel electrode layer, wherein the second insulation layer is in contact with the second insulation layer;

forming an upper pixel electrode on the second insulation layer, wherein the upper pixel electrode is in contact with the second insulation layer;

forming an orientation film on the upper pixel electrode; and forming a liquid crystal layer on the orientation film;

wherein the lower common electrode, the first insulation layer, the intermediate pixel electrode, the second insulation layer, the upper pixel electrode, and the orientation film are located between the first substrate and the liquid crystal layer;

wherein the lower common electrode is a planar common electrode, the upper pixel electrode and the intermediate pixel electrode are slits pixel electrode and perpendicular to each other; and wherein the intermediate pixel electrode is located in an edge area, where a post spacer is arranged, in a set range of a display area;

wherein when a liquid crystal panel including the array substrate is in a display state, the upper pixel electrode is configured to have a first drive voltage applied thereto, providing a zero relative voltage between the intermediate pixel electrode and the lower common electrode, so that an edge electric field, parallel in direction to an orientation direction of the orientation film, is generated between the upper pixel electrode and the lower common electrode, to enable an orientation direction of liquid crystal molecules in the liquid crystal layer to be parallel to the orientation direction of the orientation film;

wherein when a liquid crystal panel including the array substrate is in a non-display state, the intermediate pixel electrode is configured to have a second drive voltage applied thereto providing a zero relative voltage between the upper pixel electrode and the lower common electrode, so that a transverse electric field, parallel in direction to the orientation direction of the orientation film, is generated between the intermediate pixel electrode and the lower common electrode, to enable the orientation direction of liquid crystal molecules in the liquid crystal layer to be maintained to be parallel to the orientation direction of the orientation film.

* * * * *